United States Patent Office 3,721,822
Patented Mar. 20, 1973

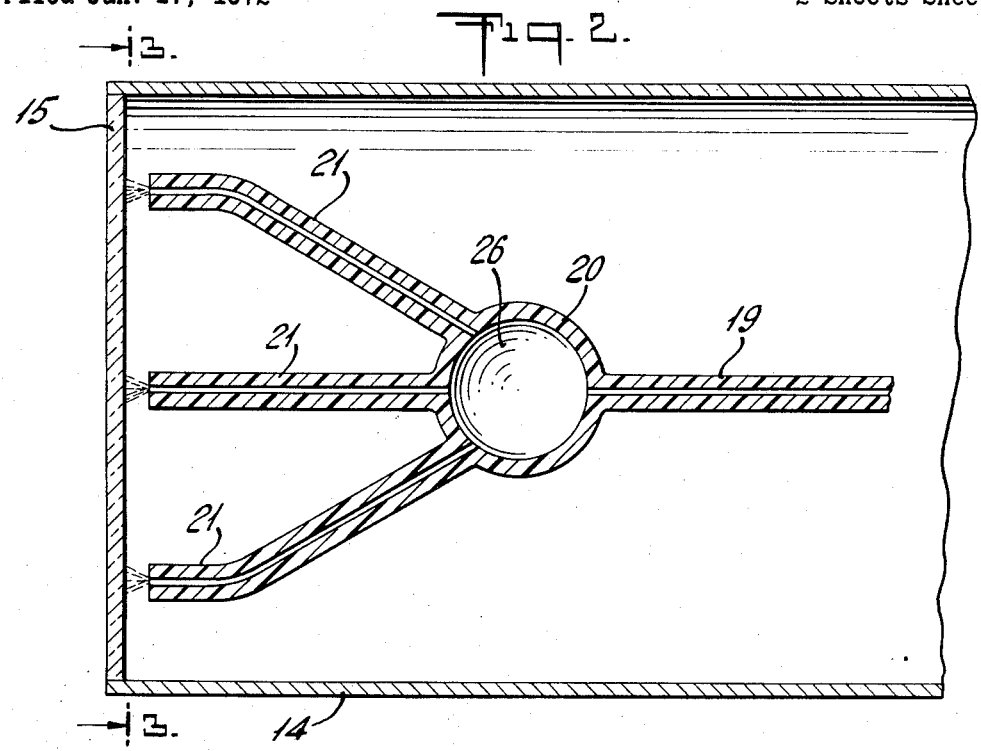
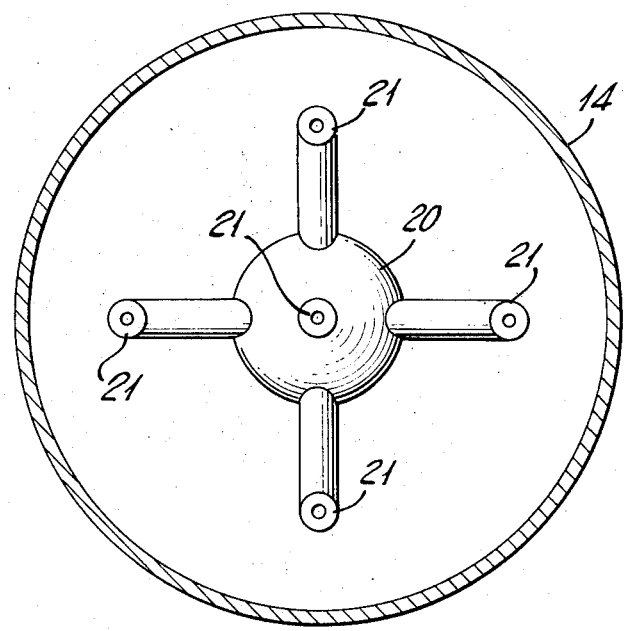

3,721,822
PHOTOCHEMICAL REACTOR
Arthur E. Klink, Lebanon, and Edward L. Paul, Fanwood, N.J., assignors to Merck & Co., Inc., Rahway, N.J.
Filed Jan. 17, 1972, Ser. No. 218,401
Int. Cl. G01n 21/26
U.S. Cl. 250—43.5                    7 Claims

ABSTRACT OF THE DISCLOSURE

Impinging jet tubular photochemical reactor system.

Figure 1:
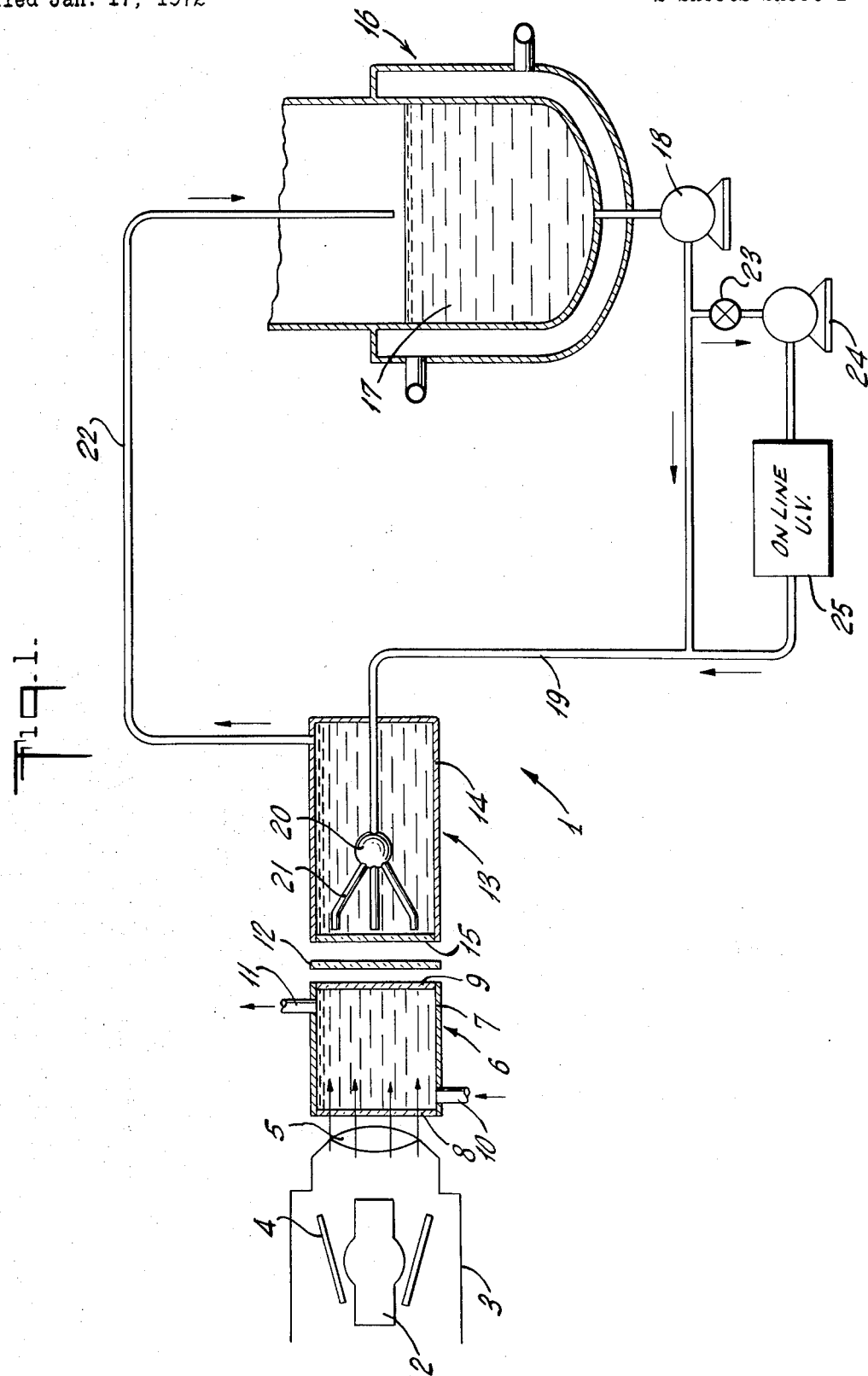

This invention relates to a new photochemical reactor system.

More particularly, this invention relates to an impinging jet tubular photochemical reactor system.

Photochemical reactors have not been widely used for several reasons. For example, they are considered uneconomical and methods are lacking for applying physical kinetic principles to conventional reactor design. Furthermore, the design of conventional reactors has hindered the development of a body of information on reaction mechanism, rate constant and light absorption coefficients.

Accordingly, it an object of this invention to provide a new photochemical reactor system which eliminates the aforesaid disadvantages.

It is a further object of this invention to provide a photochemical reactor system in which the light is distributed uniformly, the fluid is exposed in the region of maximum light intensity for a controlled amount of time, the temperature of the fluid may be automatically controlled, any one of a number of light filters can be used to protect products or portions of starting material and on-time analytical instrumentation can be used for rapid information feed-back. Furthermore, the device is economical to operate and maintain and achieves a self-cleaning method of operation which prevents the formation of thin films that can block the passage of light.

These and other objects are accomplished by the device of the present invention which will be better understood by an examination of the following description of the preferred embodiment and the accompanying drawings in which:

FIG. 1 is a schematic of the entire reactor system;
FIG. 2 is a longitudinal-sectional view of the impinging jet; and
FIG. 3 is a cross-sectional view along line 3—3 of the nozzle portion of the impingnig jet.

Referring to FIG. 1 there is shown a schematic of the entire reactor system 1. This system includes a light source 2 which consists of a Mercury-Xenon point source of light in a compact housing 3 which uses forced air to cool the bulb. Bulbs of up to 5000 watts may be used in this system. The bulb is surrounded by a parabolic reflector 4 which focuses the beam of light through a lens 5 which forms a columnated beam of light which is then passed through an optical light train which contains a D.I. water filter 6 which absorbs unwanted infrared radiation or excess heat and passes the desired ultarviolet radiation. The D.I. water filter consists of a glass tube 7 which has flanges at both ends in which quartz glass plates 8 and 9 are inserted and inlet and outlet tubes 10 and 11 through which the deionized water flows while it is circulated through the filter 6. The beam of light is then passed through a filter holder 12 which can be used for the insertion of various band-pass filters, cutoff filters or polarizing filters for the selective irradiation of substrates.

The filtered light beam is then passed into the reactor 13. The reactor consists of a piece of Pyrex pipe 14 with an optically flat piece of quartz glass inserted in a vertical plane in a flange at one end thereof. The light beam from the housing 3 is focused onto the flat quartz plate 15. A temperature controlled jacketed vessel 16 is filled with reactant 17 which is fed by a high speed centrifugal pump 18 through an inlet tube 19 into the reactor 13 where it enters the impinging pet distributor 20: The fluid is then fed through hollow jets 21 which impinge on the inner surface of the quartz glass plate 12 at a velocity such that reactant fluid forms a thin film across the inner surface which is exposed to the light beam. The continuous jet stream of reactant fluid washes the quartz glass plate to prevent the formation of degradation product films. Furthermore, the residence time of the fluid can be adjusted with the pump 18 in order to obtain the maximum reaction rate. The fluid is then returned to the vessel 16 through tube 22 whereupon it is continuously recycled for the appropriate period of time in order to obtain the desired concentration of product.

The device may also include a valve 23 which can be used to intermittently bleed samples of fluid through pump 24 and an ultraviolet spectrometer 25 for analysis of the components of the feed.

The impimging jets 21 and jet distributor 20 are shown in more detail in FIG. 2 and FIG. 3. Fluid enters the spherical hollow portion 26 of the distributor 20 through inlet tube 19 and is forced, under pressure through jets 21 onto the inner surface of the quartz glass plate 15. The jets flare out from the spherical core and are then shaped so that their discharge ends are perpendicular to and located approximately 5 mm. from the quartz glass plate when the fluid exits from them. In this manner the fluid effectively washes almost the entire inner wall of the quartz glass plate.

What is claimed is:
1. A photochemical reactor which comprises a tubular member sealed at both ends, said tubular member having at one end a quartz plate for receiving radiation therethrough; an impinging jet reactor positioned therein, said reactor having a plurality of hollow jets protruding from a hollow spherical core in the direction of said quartz glass plate, said jets bieng shaped so that their discharge ends are perpendicular to said quartz plate so that reactant fluid is fed from jets at right angles to the quartz glass plate; means which feed reactant from a source to the impinging jet reactor; an inlet tube connected to the reactant feed means, said tube entering through the end of the tubular member opposite the end having the quartz plate; and an outlet pipe to return the fluid to the source, said outlet pipe protruding from the upper portion of said tubular member.

2. A reactor as in claim 1 wherein the reactant feed means includes a high speed centrifugal pump.

3. A reactor as in claim 2 which further comprises a de-ionized water filter and means to hold a light filter.

4. A reactor as in claim 3 which further comprises a light source, said light source being contained in an air cooled housing and being surrounded by a parabolic reflector.

5. A reactor as in claim 4 wherein the light source is a Mercury-Xenon light.

6. A reactor as in claim 5 which further comprises means to analyze the composition of the reactant fluid, said means being connected to the inlet tube.

7. A reactor as in claim 6 wherein the means to analyze the reactant fluid include an ultraviolet spectrometer.

References Cited
UNITED STATES PATENTS

| | | | |
|---|---|---|---|
| 2,485,267 | 10/1949 | Ellner | 250—49 |
| 2,968,719 | 1/1961 | Haberle et al. | 250—46 |
| 2,589,689 | 3/1952 | Governale et al. | 250—46 |
| 2,621,297 | 12/1952 | Obermaier | 250—43.5 R |

JAMES W. LAWRENCE, Primary Examiner
H. A. DIXON, Assistant Examiner

U.S. Cl. X.R.

250—46, 49, 83.3 UV